United States Patent [19]
Ayers

[11] 3,868,489
[45] Feb. 25, 1975

[54] RESISTANCE WELDER

[75] Inventor: Clifton E. Ayers, New Whiteland, Ind.

[73] Assignee: P. R. Mallory & Co., Inc., Indianapolis, Ind.

[22] Filed: Nov. 9, 1973

[21] Appl. No.: 414,315

[52] U.S. Cl.................. 219/86, 219/119, 219/161, 403/56, 403/157
[51] Int. Cl............................................. B23k 9/28
[58] Field of Search........ 100/237; 219/78, 86, 119, 219/120, 161; 403/56, 122, 131, 157

[56] References Cited
UNITED STATES PATENTS

| 962,246 | 6/1910 | Rockwell | 403/56 X |
|---|---|---|---|
| 2,979,599 | 4/1961 | Width | 219/161 X |
| 3,207,884 | 9/1965 | Davis et al. | 219/86 X |
| 3,629,541 | 12/1971 | Mims et al. | 219/86 X |

FOREIGN PATENTS OR APPLICATIONS

| 1,377,560 | 9/1964 | France | 219/86 |

*Primary Examiner*—J. V. Truhe
*Assistant Examiner*—N. D. Herkamp
*Attorney, Agent, or Firm*—Charles W. Hoffmann; Robert F. Meyer; Donald W. Hanson

[57] ABSTRACT

A resistance welding apparatus utilizes a force-equalizing means including three universal ball joints to provide an equal force distribution to two welding electrodes.

5 Claims, 2 Drawing Figures

RESISTANCE WELDER

Generally speaking the present invention relates to an improvement to an electric resistance welding apparatus of the type having a housing, two shanks axially movable along guides in the housing, welding electrodes connected to the shanks, and drive means for axially moving the shafts to advance the electrodes into contact with workpieces to be welded wherein the improvement comprises a universal force-equalizing means comprising three ball joints coupled between the shanks and the drive means.

Electric resistance welding machines employing two electrodes are well known and widely used throughout many industries for the assembly of metal components. One major problem encountered in "setting up" such machines is getting both electrodes to apply equal force to the work-pieces at the beginning of a weld and following through the "flow" stage of the weld. This is necessary to obtain good quality weld and also to prolong the life of the welding electrodes. A commonly accepted method of acheiving equal force is to adjust the compressive forces of springs attached to the electrodes by trail and error until a good weld is obtained. Of course, as soon as the electrodes start wearing, the forces can change, and this is soon followed by accelerated wear on the electrodes and a deterioration in the weld quality.

The present invention provides a simple but effective solution to this problem. One adjustable compression spring is used in conjunction with a universal force equalizing means that equally divides the force exerted through the compression spring and distributes it to each of the two electrodes. The force to the electrodes remains equal even through the "flow" stage of the weld. In addition, as the electrodes wear, the forces required for welding are automatically readjusted. The result of the present invention is longer life of welding electrodes and better quality welds.

Accordingly it is a feature of the present invention to provide an electric resistance welding apparatus including a universal force-equalizing means to equalize forces applied to a pair of independent electrodes. Another feature of the present invention is to provide an electric resistance welding apparatus including an adjustable compression spring to provide a force to a universal force equalizing means where it is divided equally and distributed to a pair of independent electrodes. Another feature of the present invention is to provide an electric resistance welding apparatus including a universal force-equalizing means for a pair of independent electrodes including three universal ball joints pivotable about a common ball shaft, two of the joints being coupled to the pair of electrodes and the other ball joint being coupled to a compression spring. Still another feature of the present invention is to provide and electric resistance welding apparatus including a spring adjustment means for adjusting the force exerted by a compression spring to a pair of independent welding electrodes.

These and other features will become more apparent from the following description when taken in conjunction with the accompanying drawings wherein.

Figure 1:
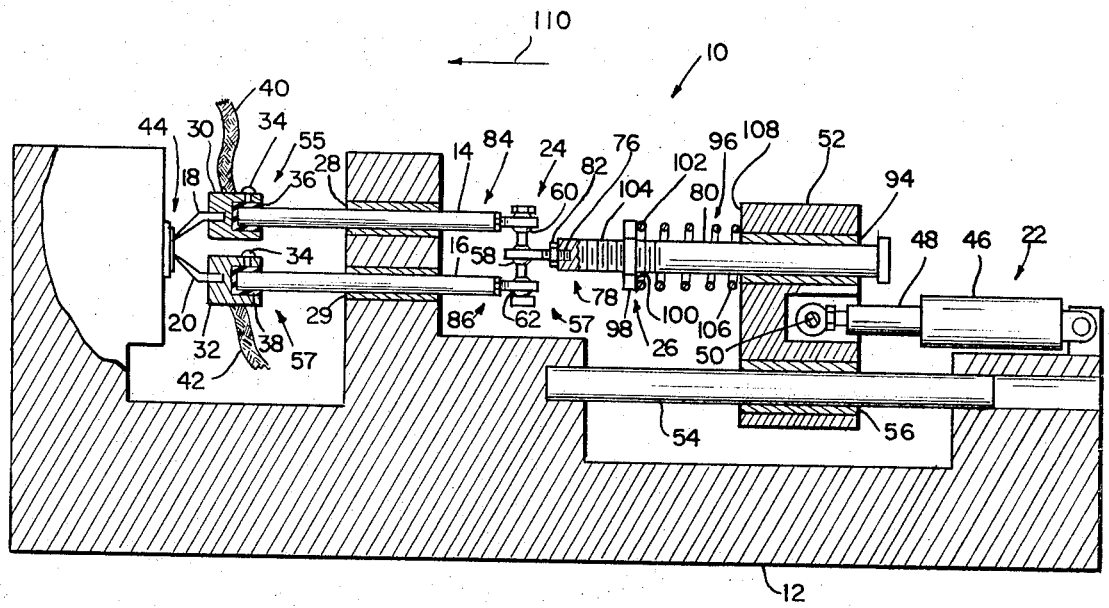
FIG. 1 is a front view of an electric resistance welding apparatus.

Refering in particular to FIG. 1, an electric resistance welding apparatus 10 includes a housing 12, two shanks 14 and 16, welding electrodes 18 and 20, drive means 22, a universal force equalizing means 24 and a force adjustment means 26.

Shanks 14 and 16 are journaled for translation through shank bushings 28 and 29 seated in housing 12. Connected to first ends 55 and 57 of shanks 14 and 16, respectively, are welding electrode holders 30 and 32. Holders 30 and 32 are secured by set screws 34 through electrical insulating sleeves 36 and 38 to shanks 14 and 16. Electrical lead wires 40 and 42 are connected between welding electrode holders 30 and 32 and a suitable welding power supply (not shown). Welding electrodes 18 and 20 are secured by welding electrode holders 30 and 32, respectively and are illustrated in FIG. 1 contacting typical workpieces 44. Many different styles of electrodes other than the configuration of electrodes 18 and 20 may be used with this apparatus without departing from the spirit and scope of the invention.

Drive means 22, comprising an air cylinder device 46 in the illustrated embodiment, is suitably connected to housing 12. As was the case with welding electrodes 18 and 20, the scope of the invention would not be compromised by using other drive means such as hydraulic cylinders, motor driven cams, and foot-operated levers to fullfill the functional requirements of drive means 22. A movable arm 48 of device 46 is attached to a post 50 carried by a slide member 52. Slide member 52 is journaled to translate along a guide shaft 54. And, guide shaft 54 is slidable in a guide bushing 56 carried by slide member 52.

Figure 2:
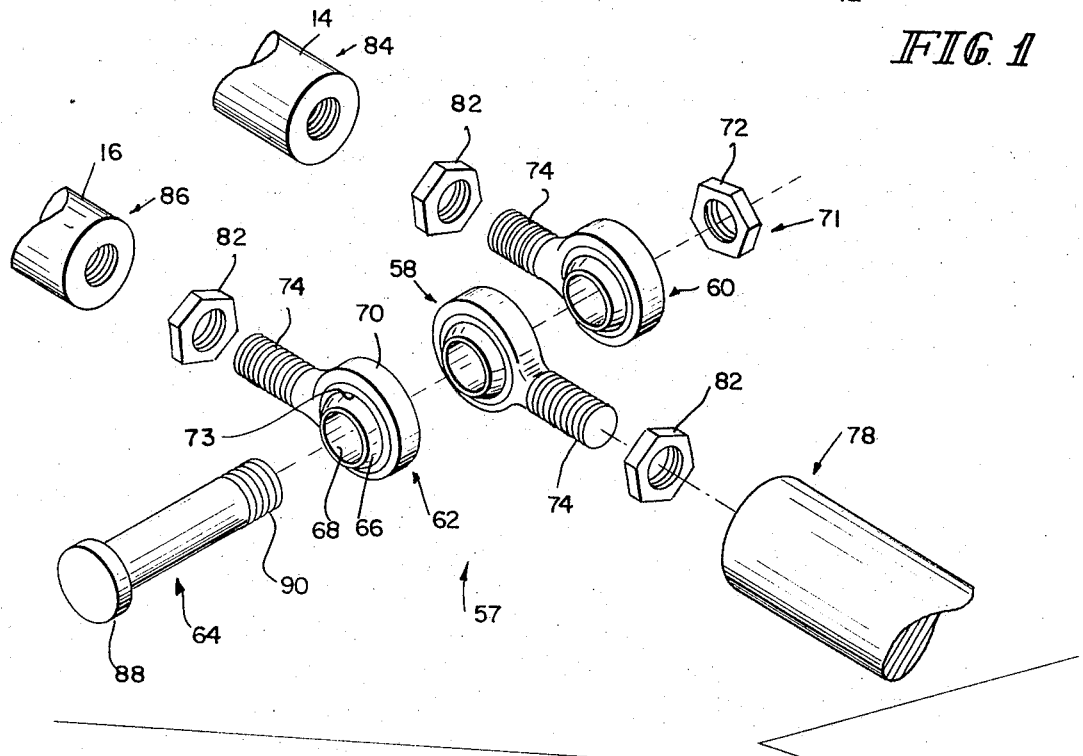
FIG. 2 is a section view of a universal-force equalizing means taken along a line 2—2.

Universal force-equalizing means 24 is coupled between shanks 14 and 16 and drive means 22 to divide the force exerted by drive means 22 into two equal forces exerted on shanks 14 and 16. Referring now primarily to FIG. 2, universal force-equalizing means 24 comprises three ball joints 57, a ball shaft 64 passing through the ball joints, and retention means 71 retaining the ball joints on the ball shaft. Ball joints 57 comprise a centermost ball joint 58 and two outermost ball joints 60 and 62. Ball joints 58, 60 and 62 are generally alike as shown in FIG. 2, and each includes a ball 66, an aperture 68 passing therethrough, and a ball housing 70. Each of ball housings 70 includes a ball cavity 73 and a threaded stud 74. Stud 74 of centermost ball joint 58 is threaded into a threaded hole 76 located in a distal end 78 of a plunger 80. Plunger 80 is slidable through a plunger guide 94 in slide member 52. A retainer nut 82 is threaded onto stud 74 to tighten centermost ball joint 58 to plunger 80.

Outermost ball joints 60 and 62 are threaded into distal ends 84 and 86 of shanks 60 and 62 and secured by retainer nuts 82. Ball shaft 64 having a head 88 on one end and a threaded portion 90 on the other, is connected to ball joints 58, 60 and 62 through apertures 68 in each of the ball joints. Centermost ball joint 58 is sandwiched in between outermost ball joints 60 and 62 so that the pivotal centers of the two outermost ball joints are equidistant to the pivotal center of the centermost ball joint. Retention means 71 comprises a ball shaft nut 72 threaded onto threaded portion 90 to retain ball joints 58, 60 and 62 on ball shaft 64.

Force adjustment means 26 regulates the amount of force exerted by drive means 22 and comprises a helical compression spring 96 carried about plunger 80 and a compression adjuster nut 98. Compression adjuster nut 98 is threaded onto a threaded portion 104 of plunger 80. A face 100 of the compression adjuster nut contacts a first end 102 of spring 96. A second end 106 of spring 96 rests against a surface 108 of slide member 52.

In operation, a welding operation is initiated by placing workpieces 44 under welding electrodes 18 and 20 and activating air cylinder device 46. Moveable arm 48 urges slide member 52 in the direction of arrow 110. Slide member 52 freely translates along guide shaft 54 as surface 108 pushes against helical compression spring 96. Spring 96, in turn, pushes against compression adjuster nut 98 carried by plunger 80. This action causes plunger 80 to move in the direction of arrow 110. Shanks 14 and 16, being connected through universal force-equalizing means 24 to plunger 80 are also moved in the direction of arrow 110 until they come into contact with workpieces 44. Upon contact, shanks 14 and 16 stop as slide member 52 continues moving until a predetermined plunger force is reached. This force is determined by the compressive force of spring 96 and adjusted by the relative position of nut 98 on plunger 80. At this point, slide member 52 stops. The compressive force of spring 96 is divided equally by universal force equalizing means 24 to shanks 14 and 16. Electric current is supplied through lead wires 40 and 42 to electrodes 18 and 20 to start the welding. As welding progresses through the "flow" stage, force exerted by spring 96 and equalized by means 24 continues as electrodes 18 and 20 advance into workpiece 44. After electric current is shut off, air cylinder device 46 withdraws shanks 14 and 16 from workpieces 44. The resultant weld is uniform and of high quality.

What is claimed is:

1. In an electric resistance welding apparatus of the type having a housing, two shanks axially movable along guides in said housing, welding electrodes connected to said shanks, and drive means for axially moving said shanks to advance said electrodes into contact with workpieces to be welded, the improvement which includes a universal force-equalizing means for dividing a force exerted by said drive means into two equal forces exerted on said shanks comprising
    a. three ball joints;
    b. a ball shaft passing through said ball joints, and
    c. retention means retaining said ball joints on said ball shaft;
    d. the centermost of said ball joints coupled to said drive means, and the outermost two of said ball housings connected to said shanks.

2. The electric resistance welding apparatus as recited in claim 1 further including a force adjustment means connected between said universal force-equalizing means and said drive means.

3. The electric resistance welding apparatus as recited in claim 2 wherein said force adjustment means comprises a helical compression spring carried about a plunger and a compression adjuster nut threaded to a threaded portion of said plunger and engaging said helical compression spring.

4. The electric resistance welding apparatus as recited in claim 1 wherein said retention means comprises a head on one end of said ball shaft and a nut threaded onto the other end of said ball shaft.

5. The electric resistance welding apparatus as recited in claim 4 wherein pivotal centers of said outermost two ball joints on said ball shaft are equidistant to a pivotal center of said centermost ball joint.

* * * * *